United States Patent
Yaniger

[11] Patent Number: 6,153,275
[45] Date of Patent: *Nov. 28, 2000

[54] MULTILAYER SYNTHETIC STOPPER

[75] Inventor: Stuart Yaniger, Ventura, Calif.

[73] Assignee: Neocork Technologies, LLC, American Canyon, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/975,413

[22] Filed: Sep. 19, 1997

Related U.S. Application Data

[63] Continuation-in-part of application No. 08/696,326, Aug. 13, 1996, Pat. No. 6,085,923.

[51] Int. Cl.[7] .......................... A47G 19/22; B28B 21/00; B28B 21/72; B28B 23/08; B29D 22/00

[52] U.S. Cl. .................. 428/34.4; 428/66.3; 428/66.4; 428/515; 428/516; 428/212; 215/355; 215/362

[58] Field of Search ................... 428/66.3, 66.4, 428/515, 516, 212, 34.4; 524/13, 14, 513; 521/50; 215/355, 362

[56] References Cited

U.S. PATENT DOCUMENTS

| 34,227 | 1/1862 | Ames. |
|---|---|---|
| 229,537 | 7/1880 | Lenglet. |
| 281,333 | 7/1883 | Barrett. |

(List continued on next page.)

FOREIGN PATENT DOCUMENTS

| 0 156 957 | 10/1981 | European Pat. Off. . |
|---|---|---|
| 0 250 057 | 6/1987 | European Pat. Off. . |
| 496194 | 1/1992 | European Pat. Off. . |
| 496 194 A1 | 10/1992 | European Pat. Off. . |
| 1 518 450 | 4/1967 | France . |
| 2 254 486 | 7/1975 | France . |
| 2501 636 | 9/1982 | France . |
| 2662 142 | 11/1991 | France . |
| 60-071643 | 4/1985 | Japan . |
| 60-204316 | 10/1985 | Japan . |
| 63-307060 | 12/1988 | Japan . |
| 4-38775 | 6/1992 | Japan . |
| 5-85555 | 4/1993 | Japan . |
| WO 87/07903 | 12/1987 | WIPO . |
| WO 95/13883 | 5/1995 | WIPO . |
| WO 98/47783 | 10/1998 | WIPO . |

OTHER PUBLICATIONS

Noshay, A. & McGrath, J.E., "Block Copolymers Overview and Critical Survey," Academic Press, New York 1997.

Ecork "Revolution" brochure, produced by Cortex as, NRF 19 Stendahl, Apr. 1996.

Primary Examiner—James J. Seidleck
Assistant Examiner—U. K. Rajguru
Attorney, Agent, or Firm—Blakely, Sokoloff, Taylor & Zafman, LLP

[57] ABSTRACT

The invention relates to a stopper for use in a substantially cylindrical bottle opening. The stopper has a substantially cylindrical shape to seal the bottle opening and includes a first polymer portion and a second material portion, wherein the second material portion coaxially overlies the first polymer portion. In another embodiment, the stopper includes a third polymer portion wherein the first polymer portion coaxially overlies the third polymer portion. The invention also relates to a method of protecting liquid in a bottle with a substantially cylindrical bottle opening. The method includes providing a stopper having a substantially cylindrical shape to seal the bottle opening and closing off the bottle by insertion of the stopper into the bottle opening. The invention also relates to a method of producing a stopper for use in a substantially cylindrical bottle opening. In one embodiment, the method includes extruding a first polymer portion through an extrusion die, coaxially coating the first polymer portion with a second material portion to form a body, and forming the body into a shape to substantially seal the bottle opening. The first polymer portion and the second material portion may be formed by co-extrusion or in a step-wise manner.

28 Claims, 5 Drawing Sheets

U.S. PATENT DOCUMENTS

| | | |
|---|---|---|
| 311,834 | 2/1885 | Hoyt . |
| 466,169 | 12/1891 | Hume . |
| 512,705 | 1/1894 | Holmes . |
| 527,517 | 10/1894 | Varley . |
| 573,239 | 12/1896 | Rockwell . |
| 706,247 | 8/1902 | Margetts . |
| 706,634 | 8/1902 | Blumer . |
| 2,463,952 | 3/1949 | Cooke . |
| 2,549,404 | 4/1951 | Williams . |
| 3,406,127 | 10/1968 | Alexander . |
| 3,442,411 | 5/1969 | Mahoney . |
| 3,549,472 | 12/1970 | King et al. . |
| 3,589,280 | 6/1971 | Wilde ........................................ 101/35 |
| 3,715,047 | 2/1973 | Sado . |
| 3,900,124 | 8/1975 | Marcel ................... 215/291 |
| 3,984,022 | 10/1976 | Babiol . |
| 4,042,543 | 8/1977 | Strickman et al. . |
| 4,081,720 | 3/1978 | Pfefferkorn et al. ................... 215/354 |
| 4,091,136 | 5/1978 | O'Brien et al. ......................... 428/141 |
| 4,188,457 | 2/1980 | Throp ..................................... 428/542 |
| 4,259,901 | 4/1981 | Kidd ........................................ 101/42 |
| 4,285,186 | 8/1981 | Desom ........................................ 53/64 |
| 4,363,416 | 12/1982 | Loughmiller ............................. 215/364 |
| 4,363,849 | 12/1982 | Paisley et al. ....................... 428/318.8 |
| 4,373,437 | 2/1983 | Rodenbaugh et al. .................... 101/35 |
| 4,499,141 | 2/1985 | Paisley et al. ....................... 428/318.8 |
| 4,507,405 | 3/1985 | Paisley et al. ......................... 521/84.1 |
| 4,522,856 | 6/1985 | Paisley et al. . |
| 4,529,740 | 7/1985 | Trainor ...................................... 521/84 |
| 4,544,677 | 10/1985 | Allen et al. ............................... 521/91 |
| 4,695,594 | 9/1987 | Pressman ................................. 521/92 |
| 4,756,436 | 7/1988 | Morita et al. .......................... 215/228 |
| 4,847,150 | 7/1989 | Takeda ................................ 428/318.8 |
| 4,882,378 | 11/1989 | Himes ..................................... 524/505 |
| 5,317,047 | 5/1994 | Sabate et al. . |
| 5,480,915 | 1/1996 | Burns . |
| 5,496,862 | 3/1996 | Burns ....................................... 521/50 |
| 5,692,629 | 12/1997 | Burns . |
| 5,703,166 | 12/1997 | Rajagopalan et al. .................. 525/196 |
| 5,710,184 | 1/1998 | Burns . |
| 5,824,746 | 10/1998 | Harris et al. ............................ 525/196 |
| 5,904,965 | 5/1999 | Noel et al. ............................. 428/36.5 |
| 5,904,970 | 5/1999 | Lauer et al. .............................. 428/71 |

MULTILAYER SYNTHETIC STOPPER

CROSS-REFERENCE TO RELATED APPLICATIONS

This application is a continuation in part of U.S. application Ser. No. 08/696,326 which was filed on Aug. 13, 1996, now U.S. Pat. No. 6,085,923.

BACKGROUND OF THE INVENTION

1. Field of the Invention

The invention relates to bottle stoppers and more particularly to synthetic stoppers for use in wine bottles and other similarly packaged products.

2. Description of Related Art

Natural cork is the most common material for making stopper-type bottle closures. The use of cork to finish wine and other food products dates back centuries. Natural cork is a wood product. The disadvantages of the use the natural wood product are well-known. These disadvantages include, inconsistency in structure leading to leakage and premature aging of the bottle contents, susceptibility of the contents to contamination from trichloroanisole (TCA) which gives the bottle contents a musty aroma, and a tendency to dry and crumble with age, storage, or dry environments.

Alternatives to natural cork stoppers have been known for many years. U.S. Pat. No. 466,169 issued to Hume discloses a stopper formed of a strip of textile material, such as canvas, filled with rubber and rolled up in the shape of a tapered stopper The resulting stopper structure consists of a core of textile material surrounded and enveloped with rubber. U.S. Pat. No. 512,705 issued to Holmes discloses a method of making a cork-like stopper of fiber pulp by pressing the pulp into proper form in suitable molds. The stopper can be used directly from the mold. However, in order to render the stopper water and acid proof, the stopper is dipped in melted paraffin wax.

Synthetic closures have also been developed to remedy the disadvantages associated with natural wood bark cork. For example, U.S. Pat. No. 281,333 issued to Barrett discloses a method of making a stopper consisting of pressing or forcing suitable plastic material, such as lignite, into a tube in a mold of vulcanite, xylonite, celluloid, or like material. The molded stopper produced is of a plastic material with a skin of vulcanite, xylonite, celluloid, or like material. U.S. Pat. No. 5,480,915 issued to Burns discloses the use of a thermoplastic elastomer and a commercially available blowing agent injection molded to form a porous cork-like structure. U.S. Pat. No. 4,188,457 issued to Throp discloses the use of a foam plastic injection-molded closure made with an ethylene vinyl acetate (EVA) polymer formed with sodium metabisulphite. French Patent No. 1,518,450 issued to Daicel Ltd. describes a closure produced by compressing a mat of thermoplastic fibers to form a porous plug. U.S. Pat. No. 4,042,543 issued to Strickman, et al., describes a stopper that combines a polymer with cork particles. European Patent Application 92100058.4 filed by Fantin on Jan. 9, 1991, and published Jul. 29, 1992, describes a plastic stopper with a cylindrical elastic insert made of granulated cork or a high density plastic material with resilient characteristics, or natural or synthetic rubber.

The difficulty with these prior art structures are numerous. First, the synthetic stoppers are not compatible with conventional cork insertion machinery. A standard wine bottle throat or neck has an inside diameter of approximately 18.5 mm ±0.5 mm. Thus, a stopper must have a slightly larger diameter to properly seal the bottle. Cork insertion machinery is used to compress the stopper and insert the stopper into the neck of the bottle. Upon compression in the cork insertion machinery, the cork's diameter is reduced to approximately 15.0 mm diameter. The prior art stoppers cannot withstand the compression of the corking equipment without cutting, creasing, or wrinkling. This is particularly true with those stoppers whose inner density or elasticity is less than their outer density or elasticity. In such cases, the compression machinery overcomes the resistance of the outer walls of the stopper, causing the stopper to cut, crease, or wrinkle. A cut, creased, or wrinkled stopper will not completely expand to its desired shape in the bottle and thus will not properly seal the bottle. U.S. Pat. No. 4,091,136, issued to O'Brien, et al., seeks to remedy the problem of creasing or wrinkling by abrading or cutting off the outer, more dense, layer of its extruded polymer foam stopper, then coating the remaining polymer foam with a wax. This necessitates extra process steps and creates a great deal of wasted material and dust particles.

Other difficulties associated with prior art stoppers include a difficulty in extraction of the stopper from the bottle due to poor closure compressibility; poor compressive and sealing properties; and the possibility of extraction of undesirable taste and aromas from plasticizers and other additives or from a chemical reaction between the stopper and the wine. Finally, a significant obstacle to the use of the thermoplastic stoppers is the relatively high cost associated with producing thermoplastic stoppers by a conventional injection molding process.

SUMMARY OF THE INVENTION

A stopper for use in substantially cylindrical bottle opening is disclosed. The stopper has a substantially cylindrical shape to seal the bottle opening and includes a first polymer portion and a second polymer portion, wherein the second polymer portion coaxially overlies the first polymer portion. In one embodiment, the first polymer portion includes a polyolefin. In another embodiment, the first polymer portion includes a mixture of polymers, for example ethylene/methacrylic acid co-polymer based ionomer resin, and low density polyethylene. In one embodiment, the second polymer portion is an ionomer resin, for example, ethylene/methacrylic acid co-polymer based ionomer resin, or an elastomeric resin, such as ethylene vinyl acetate (EVA) co-polymer. The second polymer portion may function as a tough, cut-resistant outer skin such as in the ionomer example, or a flexible, elastomeric skin, such as in the EVA example, that provides an excellent seal against the bottle neck.

In another embodiment, the stopper includes a third polymer portion wherein the first polymer portion coaxially overlies the third polymer portion and wherein the third polymer portion is one of a high density polyethylene polymer and a high density polypropylene polymer. In this embodiment, the third polymer portion acts as a center core of a relatively stiff polymer that is overcoated with a more resilient polymer, which is in turn overcoated with either a cut-resistant skin layer, such as an ionomer, or a flexible, elastomeric skin, such as EVA, for improved sealing properties.

Also disclosed is a method of protecting liquid in a bottle with a substantially cylindrical bottle opening. The method includes providing a stopper having a substantially cylindrical shape to seal the bottle opening and closing off the bottle by insertion of the stopper into the bottle opening. The stopper has a first polymer portion and a second polymer portion, wherein the second polymer portion overlies the first polymer portion.

Further disclosed is a method of producing a stopper for use in a substantially cylindrical bottle opening. In one embodiment, the method includes extruding a first polymer portion through an extrusion die, coaxially coating the first polymer portion with a second polymer portion to form a body, and forming the body into a shape to substantially seal the bottle opening. The first polymer portion and the second material portion may be formed by co-extrusion in a coaxial manner or in a step-wise manner utilizing cross-head or other known extrusion techniques.

In a second embodiment of a method of producing a stopper for use in a substantially cylindrical bottle opening, the method includes extruding a first polymer portion through an extrusion die, coaxially coating the first polymer portion with a second polymer portion, coaxially coating the second polymer portion with a third polymer portion to form a body, and forming the body into a shape to substantially seal the bottle opening. Once again, the coaxial extrusion may be performed simultaneously or in a step-wise manner utilizing cross-head or other known techniques.

These and other aspects of the invention will become evident upon reference to the following detailed description and attached drawings.

BRIEF DESCRIPTION OF THE DRAWINGS

FIGS. 4–6 demonstrate a method of forming the multi-layer stopper in accordance with the invention, specifically the embodiment wherein the stopper is comprised of two layer portions and is formed in a step-wise manner.

FIGS. 7–9 demonstrate a method of forming the multi-layer stopper in accordance with the invention, specifically an embodiment wherein the multiple layers are extruded simultaneously.

FIGS. 11–13 demonstrate a method of forming a multi-layer stopper in accordance with the invention, specifically the embodiment wherein the stopper includes three layer portions, each having different properties.

DETAILED DESCRIPTION OF THE INVENTION

A multi-layer stopper, a method for making a multi-layer stopper, and a method for using a multi-layer stopper to protect liquid in a bottle is described. In the following detailed description, numerous specific details are set forth, such as specific materials, forms, and properties, as well as specific methods of manufacture, in order to provide a thorough understanding of the invention. It will be clear to one skilled in the art, however, that these specific details need not be employed to practice the invention.

In one aspect of the invention, there is provided a multi-layer stopper for use in a bottle opening as a suitable replacement for natural wood bark cork. Accordingly, the invention features a stopper for use in a substantially cylindrical bottle opening, preferably a wine bottle opening, having a substantially cylindrical shape to be disposed in the bottle opening, thereby preventing spillage of the bottle contents and preventing passage of oxygen from the atmosphere to the contents, e.g., wine. In one embodiment, the body is made up of a first polymer portion and a second polymer portion that overlies the first polymer portion in a coaxial alignment. In another embodiment, the stopper is made up of a "core" of one polymer, coaxially surrounded by another polymer having properties different than the core polymer, and coaxially surrounded by a third polymer portion. The multi-layer embodiments highlighted provide the stopper with superior compressive and sealing properties compared to other synthetic stoppers or natural wood bark corks.

Figure 1:
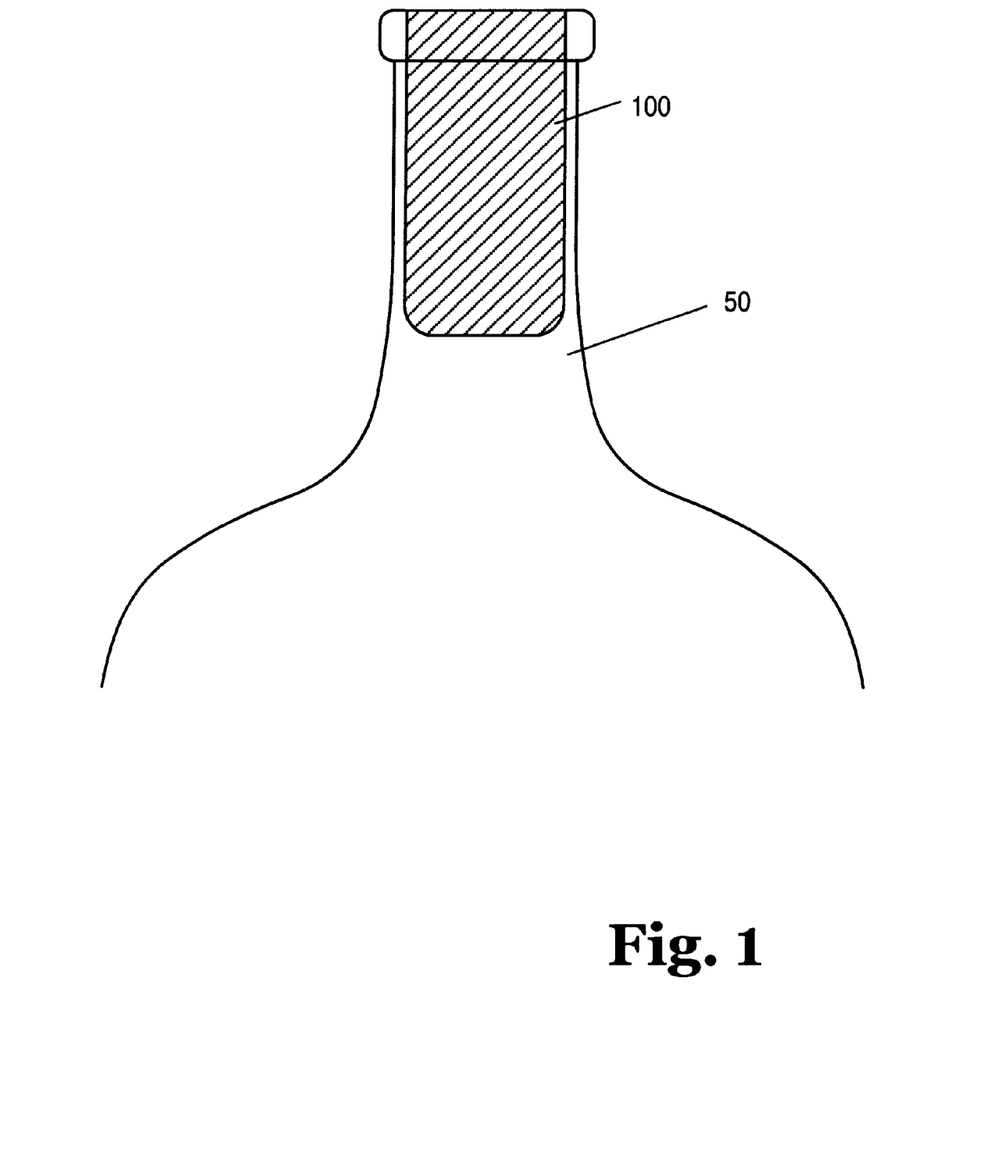
FIG. 1 is a planar side view of a bottle with the multi-layer stopper of the invention inserted in the substantially cylindrical bottle opening.

FIG. 1 illustrates a planar side view of a bottle 5 with a stopper 100 of the invention inserted in the substantially cylindrical bottle opening of the bottle 50. FIG. 1 illustrates that the stopper 100 functions similar to natural wood bark corks to finish wine.

Figure 2:
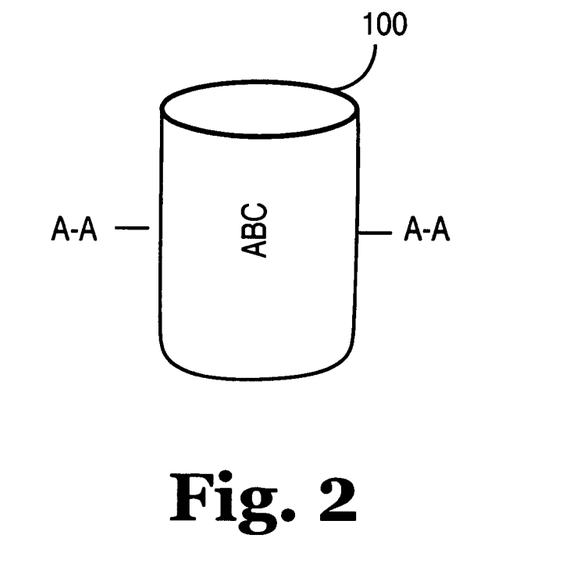
FIG. 2 is a front perspective view of an embodiment of the stopper of the invention illustrating a shape of the stopper body.

FIG. 2 illustrates a perspective view of a contemplated shape of stopper 100 of the invention. Stopper 100 is formed of multi-layer portions. FIG. 2 shows an embodiment where letters are printed on the stopper body. In this embodiment, stopper 100 can retain printed matter on the surface that contacts the container. For example, a producer's or manufacturer's name, logo, or other trademark may be displayed on stopper 100.

Figure 3:
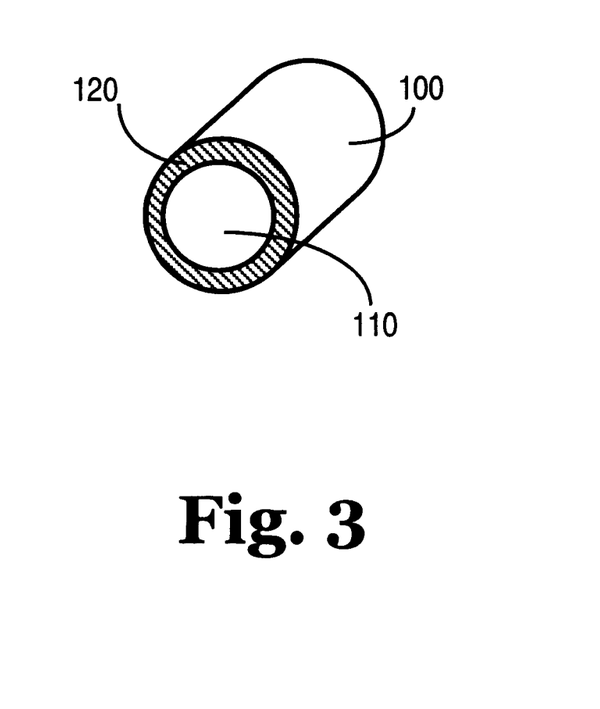
FIG. 3 is a perspective cut-away view of the stopper shape of FIG. 2 illustrating a first embodiment of the multi-layer structure of the stopper taken through line A—A of FIG. 2.

FIG. 3 shows an embodiment of stopper 100 taken through line A—A of FIG. 2. The embodiment shown in FIG. 3 includes a first polymer portion 110 and a second polymer portion 120 overlying, in a coaxial alignment, polymer portion 110. In this embodiment, polymer portion 110 is, for example, a mixture of a polyolefin blend of metallocene co-polymers and high melt strength (low melt index), low density polyethylene (LDPE). Typically, preferred low density polyethylene resins have a melt index of from 0.5 to 10 and a density of from about 0.910 to 0.935 gm/cc. An example of a polyolefin blend of metallocene co-polymers include, but are not limited to, those manufactured by The Dow Chemical Co., Midland, Mich., and bearing the trademark Dow Affinity PF1140®. A suitable low density polyethylene includes, but is not limited to, one manufactured by Dow Company, and bearing the trademark Dow 662I®. Other suitable components for polymer portion 110 include, but are not limited to, ethylene vinyl acet ate (EVA), such as manufactured by E.I. du Pont de Nemours & Co., Wilmington, Del., and bearing the trademark ELVAX 5600®, and blends of polyolefins and styrene-butadiene co-polymer, such as manufactured by Shell Chemical Co. under the trademark KRATON 101®. Generally, polyethylenes, polypropylenes, and blends of the same or blends with styrene ethylene butadiene styrene (SEBS).

To form polymer portion 110, a polyolefin blend of metallocene co-polymers, such as Dow Affinity 1140® and a low density polyethylene such as Dow 662I® are mixed and processed by standard foam extrusion means to form a foamed polymer profile of slightly smaller diameter than the desired final diameter of the stopper. A closed-cell foamed polymer portion 110 can be formed with the desired suppleness and resiliency with the proper selection of polymer blending ratios and control of the foam density. In one embodiment, the blend consists of a 3:1 ratio of metallocene co-polymers (e.g., Dow Affinity PF1140®) to low density polyethylene (e.g., Dow 662I®), by weight. Polymer portion 110 may further contain a small amount of an ionomer resin. Ionomer resins increase the toughness, the resiliency, and the barrier properties of stopper 100. Suitable ionomer resins include, but are not limited to, those derived from ethylene/methacrylic acid co-polymers. They are generally known as SURLYN® ionomers. SURLYN is a registered trademark of E.I. du Pont de Neimours & Co. SURLYN ionomer resins are compatible with polyolefins and may be used in amounts ranging from 0.2% to 50% by weight of polymer portion 110. One embodiment contemplates ionomer resin in the range of 0.5–5% by weight of polymer portion 110.

In another embodiment of the invention, polymer portion 110 is combined with one or more blowing agents. The combination of a blowing agent with a polymer is well-known in the plastics processing art. The blowing agent provides cells in the polymer body which give the stopper additional flexibility. The blowing agent is generally present in an amount less than 10% of the total polymer composition, and, in one embodiment, is in the range from about 1% to about 3% of the polymer composition. Of course, the precise amount of blowing agent may be determined by one skilled in the art taking into account the precise polymer, blowing agent, and other ingredients used, as well as the molding conditions. Suitable blowing agents include, but are not limited to, chemical blowing agents including BIF40, commercially available from BI Chemicals, Montclaire, N.J., SPECTRATECH® FM1150H, commercially available from Quantum Chemical Corp., USI Division, Cincinnati, Ohio, azodicarbonamide, azodecarbonoxide, inorganic carbonates like sodium bicarbonate, inorganic sulfonates, sodium metabisulfate, and 2,2'-dialkoxy-2,2'-azopropanes sulfonyl semicarbizides, and sulfazides.

The properties of the stopper body associated with the blowing agent can also be obtained by the use of direct pressurization of the polymer in the mold or extruder barrel by physical blowing agents, including but not limited to, nitrogen, CFCs, $CO_2$, sulfur hexafluorides, carbon dioxide, HFCs, butane, or isobutane. Cell formation is assisted by the presence of nucleating agents such as talc or CELOGEN®, manufactured by Uniroyal Chemical, Middlebury, Conn.

In one embodiment, the density of polymer portion 110 is 15 pounds per cubic feet (lb./cu.ft.), with a cell size of 0.5 millimeters (mm) or less. Further, the outer diameter of polymer portion 110 is approximately 0.5–1.0 mm smaller than the desired final diameter of stopper 100 (22–25 mm).

Figure 4:
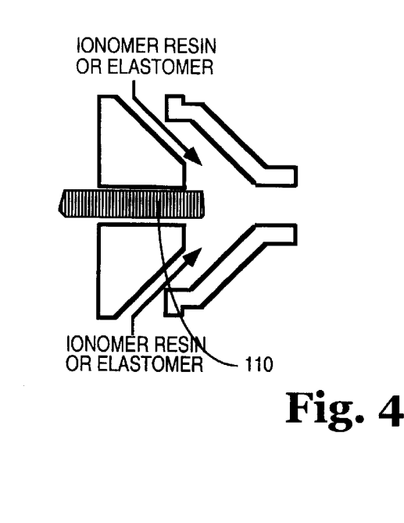
FIG. 4 is a planar side view of a formed first polymer portion being fed into a cross-head die along with a second polymer portion.
Figure 5:
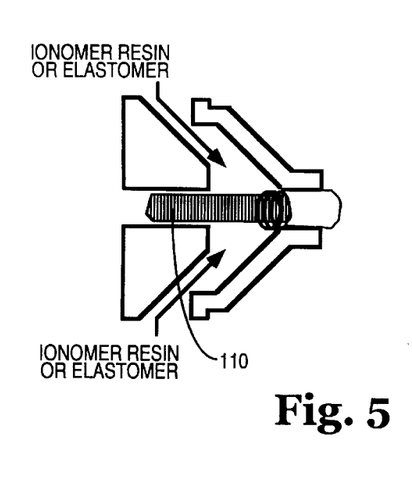
FIG. 5 is a planar side view wherein a formed first polymer portion is brought into contact with a second polymer portion in the cross-head die.
Figure 6:
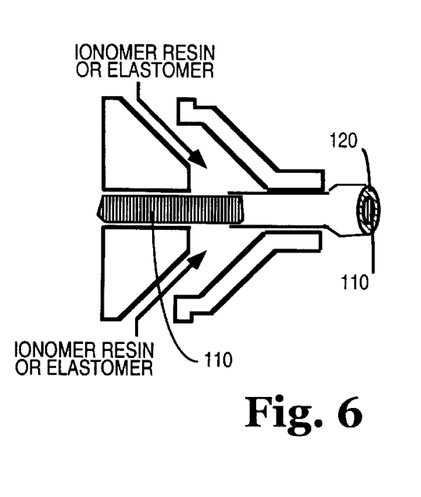
FIG. 6 is a planar side view of a multi-layer stopper rod leaving the cross-head die.

In one embodiment, presented schematically in FIGS. 4–6, polymer portion 110 is fed into a cross-head die (FIG. 4), where an outer polymer portion 120 of a tough, cut-resistant polymer foam, such as an ionomer resin, is coaxially coated over the profile (FIG. 5). For example, a low melt flow resin such as an ionomer resin like SURLYN 1652®, is coated over polymer portion 110 to a thickness of approximately 2 mm.

Powder or liquid pigments may be added to outer material portion 120 to give the stopper a desired color or tint. The powder or liquid pigments generally constitute less than 1% of the total composition. Other additives may also be included to impart various desired properties. These additives include hardening or crosslinking agents, surfactants, and viscosity modifiers. Further, a lubricant such as a fatty acid, a silicone, an alcohol, or water (including mineral water) may be added before or after extrusion. The lubricant facilitates the insertion and removal of the stopper into or from the bottle opening, respectively. Preferably the lubricant is a fatty acid and comprises less than about 0.5% of the total composition.

FIG. 6 shows a multi-layer stopper rod exiting the cross-head die. The stopper rod includes polymer portion 110 coaxially covered with polymer portion 120. Once the stopper rod exits the die, the stopper rod may be cut into appropriate stopper lengths.

Figure 7:
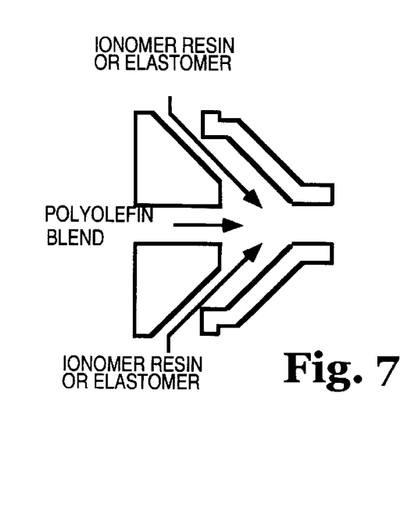
FIG. 7 is a planar side view of a first polymer portion and a second polymer portion inserted into a co-extrusion die.
Figure 8:
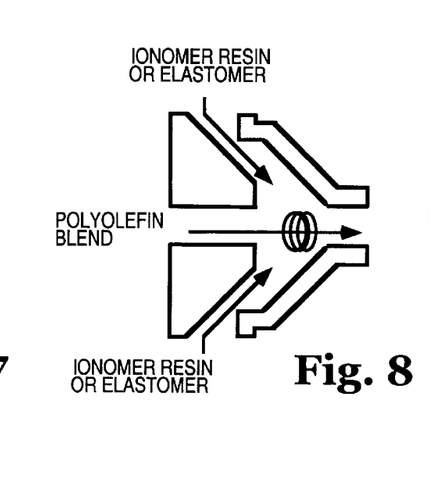
FIG. 8 is a planar side view wherein the first polymer portion is brought into contact with the second polymer portion.
Figure 9:
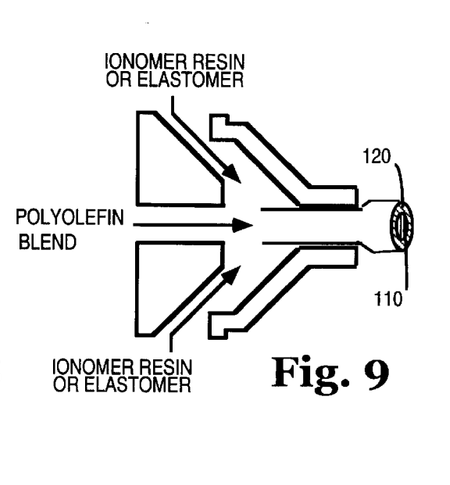
FIG. 9 is a planar side view of the multi-layer stopper rod as it leaves the co-extrusion apparatus.

In another embodiment, presented schematically in FIGS. 7–9, the multiple layers, e.g., polymer portion 110 and polymer portion 120 may be extruded simultaneously. As shown in FIG. 7, both a polyolefin blend as described above and an ionomer resin are added to the crosshead die approximately simultaneously. The ionomer resin forms an outer layer coaxially over the polyolefin blend in FIG. 8. In FIG. 9, a multi-layer stopper rod is extruded from the crosshead die.

The embodiment described above with reference to FIGS. 3–9 illustrates a stopper having polymer portion 120 that is an outer skin of a tough, cut-resistant polymer. Other components can be used to achieve other desired skin properties, such as frictional or sealing properties beneficial for the use of a synthetic cork in a wine bottle. For example, foamed polymer portion 110, as in the previous embodiment, can be similarly fed into a cross-head coating die, wherein polymer portion 110 is coaxially coated with a 0.5–1.0 mm layer of a soft hot-melt adhesive system. An exemplary soft hot-melt adhesive system is a polyolefin wax such as BAYMEL®. BAYMEL® is a trademark of International Group, Inc., Wayne, Pa. The adhesive system is an elastomer that provides an excellent seal against a glass bottle neck and is sufficiently flowable so as to "heal" any cuts or wrinkles resulting from insertion operation, e.g., such as may develop through the use of the cork insertion machinery. Examples of other components for polymer portion 120 include materials with an elastic modulus and recovery properties that include, but are not limited to, elastomers such as the styrene-butadiene KRATON® (e.g., KRATON G®) manufactured by Shell Chemical Co., Houston, Tex., SEBS (e.g., SEBS 0117-5®, a compound of SEBS with polypropylene) manufactured by M.A. Hanna, North Ridgeville, Ohio, and ELVAX 450® EVA manufactured by E.I. du Pont de Nemours & Co. Pigments or other additives may be added to these alternative material portion 120 components as noted above.

One embodiment includes a 0.880 inch diameter foamed polymer portion 110 of Dow 662I LDPE and Dow PF 1140 Affinity resin in a weight ratio of 25% LDPE to 75% resin. A butane blowing agent is used to yield a density of 22 pounds per cubic foot. The stopper has an outer elastomeric polymer portion 120 having a thickness of approximately 0.005 inches is M.A. Hanna XL0117-5 that coaxially overlies polymer portion 110.

Figure 10:
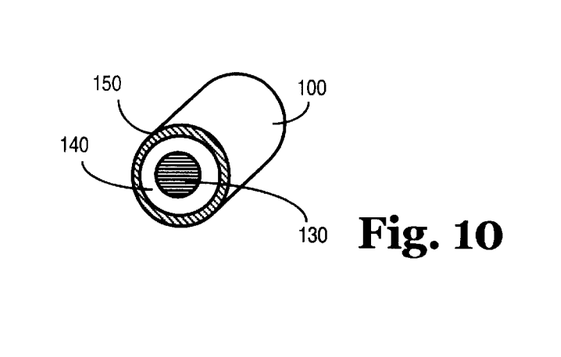
FIG. 10 is a perspective cut-away view of the stopper shape of FIG. 2 illustrating a second embodiment of the multi-layer structure of the stopper taken through line A—A of FIG. 2.
Figure 11:
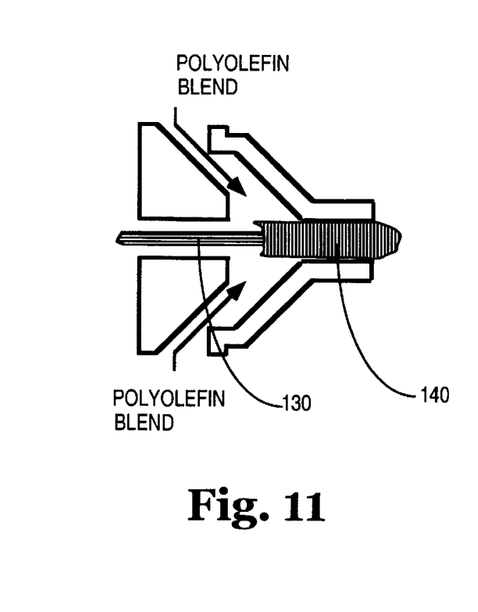
FIG. 11 is a planar side view of a first polymer portion, and being coaxially coated by a second polymer portion.
Figure 12:
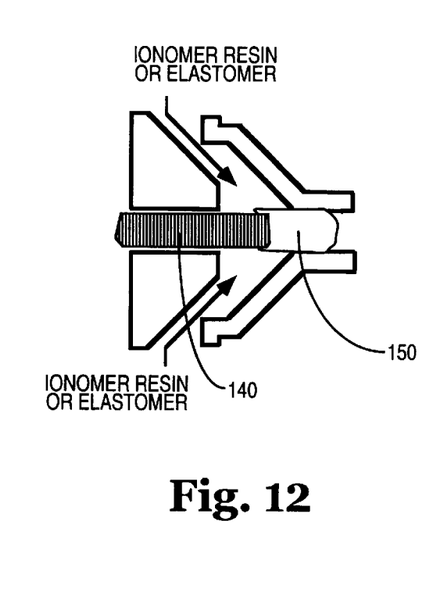
FIG. 12 is a planar side view of a multi-layer portion being coaxially coated by a third polymer portion.
Figure 13:
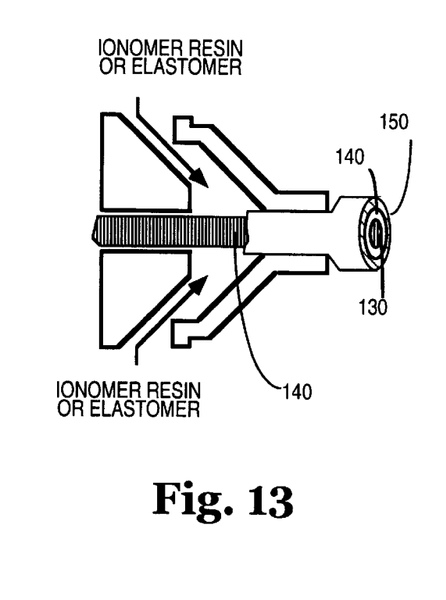
FIG. 13 is a planar side view of a stopper rod leaving the co-extrusion die and being comprised of three layer portions.

FIG. 10 illustrates another embodiment of the invention. FIGS. 11–13 present a method of producing this embodiment. FIG. 10 shows an embodiment created with the purpose of minimizing "stress creep". In stopper technology, "stress creep" is the tendency of the stopper to lose its holding force against the wine bottle throat over a period of time. Ideally, stress creep should be minimized so that the stopper maintains its maximum holding force over time. In the embodiment shown in FIG. 10, and the process presented in FIGS. 11–13, a center "core" 130 of a relatively stiff, low stress creep foam, for example, foamed high density polyethylene (HDPE), is inserted into a cross-head die (FIG. 11) and coaxially overcoated as above (as shown in FIG. 12) with a more resilient polymer 140, such as a foamed mixture of a polyolefin blend of metallocene co-polymers and a low density polyethylene as described above with reference to polymer portion 110 of FIG. 3. As shown in FIG. 13, polymer core 130 and polymer second layer 140 are in turn coaxially overcoated with a cut-resistant skin layer 150, such as a SURLYN® ionomer or an elastomer such as ELVAX 560® EVA or ELVAX 450® EVA.

In one embodiment, a generic high density polyethylene, such as for example, PETROTHENE®, manufactured by U.S. Industrial Chemicals Company, New York, N.Y., is foamed with a chemical or physical foaming agent, that can include, but is not limited to, azodicarbamides, inorganic carbonates, inorganic sulfonates, 2,2'-dialkoxy-2,2'-azopropanes sulfonyl semicarbazides, sulfazides, carbon dioxide, HFCs, and isobutane. In one embodiment, the foam diameter of core 130 is 12 mm with a density of 22–25 lb./cu.ft. Core foam 130 is co-extruded with a first coaxial coating layer 140 consisting of a polyolefin blend (e.g., Dow Affinity 1140) and low density polyethylene (e.g., Dow 662I) in a proportion of 85:15. The thickness of polymer layer 140 is 9–12 mm and has a density of 15 lb./cu.ft. A second coaxial coating layer 150 is co-extruded to form an outer skin layer 150 that is either tough and cut-resistant (such as an ionomer resin) or that maximizes frictional or sealing properties (such as a polyolefin wax).

Figure 14:
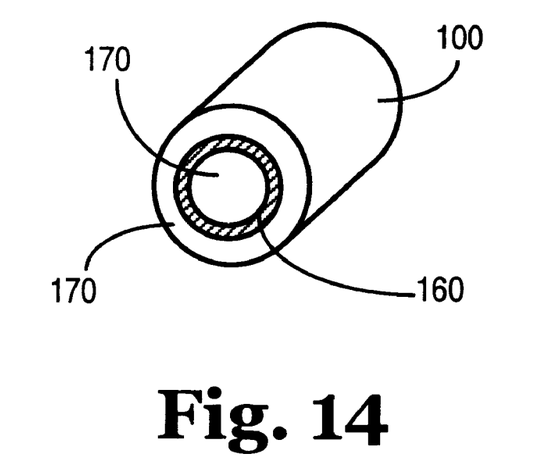
FIG. 14 is a perspective cut-away view of the stopper shape of FIG. 2 illustrating a third embodiment of the multi-layer layer structure of the stopper taken through line A—A of FIG. 2.
Figure 15:
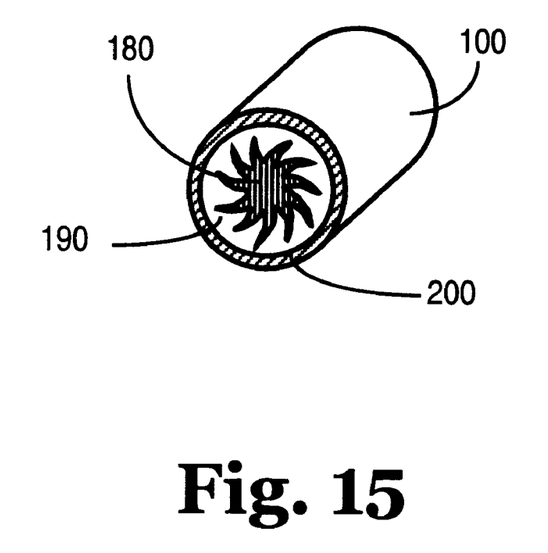
FIG. 15 is a perspective cut-away view of the stopper shape of FIG. 2 illustrating a fourth embodiment of the multi-layer structure of the stopper taken through line A—A of FIG. 2.

FIGS. 14 and 15 illustrate still other embodiments of the multi-layer stopper of the invention. FIG. 14 and FIG. 15 are side perspective view of distinct embodiments of the stopper of the invention taken through line A—A of FIG. 2. FIGS. 14 and 15 show embodiments where a resilient polymer foam is co-extruded with a stiffener geometry 160 and 180, respectively. Stiffeners 160 and 180 may be a more dense foam or solid, and may take the form of either a cylinder, i.e., FIG. 14, or a "pinwheel" or similar configuration that has at least three-fold radial symmetry, i.e., FIG. 15. The embodiment shown in FIG. 15 has the advantage that its stiffener geometry may be chosen so as to form a spring-like tension for maintaining proper sealing force against the inside of the bottle neck over extended periods of storage, i.e., minimal stress creep.

The stiffener 160 or 180 of FIG. 14 or FIG. 15, respectively, is coaxially coated with a resilient polymer portion 170 or 190, respectively, that is, for example, a mixture of a polyolefin blend of metallocene co-polymers and a low density polyethylene. In the embodiment shown in FIG. 14, polymer portion 170 coaxially covers stiffener 160 and is extruded to fill the substantially cylindrical opening of stiffener 160. The embodiment shown in FIG. 15 is coaxially overcoated with a skin 200, as described above, specifically with reference to FIG. 10.

One example of a stopper 100 as shown in FIG. 15 is formed as follows. First, a stiffener portion 180 of polypropylene, such as Amoco 8410® is co-extruded with a polymer 190 consisting of a 85:15 blend of polyolefin (e.g., Dow Affinity 1140®) and low density polyethylene (e.g., Dow 662I®). The resulting structure is coaxially overcoated with a material portion 200 that is a 0.5 mm skin of an elastomer.

It is to be appreciated that the embodiments of the multi-layer stopper of the invention discussed herein, may be formed simultaneously, i.e., via co-extrusion, or sequentially by a series of coating steps. Both methods have been presented with respect to alternative stopper embodiments.

The stopper described in each of the above embodiments of the invention is inert in wine and other food products and will not absorb gases or other components from the bottle contents or the head space within, for example, a wine bottle between the stopper and the contents. The stopper will also not allow significant amounts of air to reach the interior of the bottle. The stopper may be used over an extended period as, for example, in accordance with the desired aging properties of many wines. The stopper resists reaction of solvation and alcohol, acid, or base and does not taint the wine with any chemical or smell.

The stopper of the invention is compatible with cork insertion machinery. The invention contemplates that the stopper can withstand the compression of the machinery without cutting, creasing, or wrinkling.

The stopper of the invention seals the standard wine bottle and permits the wine bottle to be stored immediately in any position, including on the bottle's side or inverted. The sealing properties of the stopper will allow it to withstand typical bottle head space pressure changes. For example, wines are often bottled at approximately 50–55° F. but can be exposed to 80–100° F. during shipping and storage. This temperature change can create head space pressure changes in the bottles. The sealing properties of the stopper of the invention can withstand such head space pressure changes. Further, many wines are bottled with a slight "fizz" of $CO_2$ that remains in the bottle after the stopper is installed in the bottle opening. The stopper of the invention can withstand head space pressure changes due to residual $CO_2$ in the bottle.

The stopper of the invention is easily extractable with conventional corkscrews. The stopper can be removed with a conventional corkscrew without substantial expansion, crumbling, or disintegration.

The stopper of the invention retains its resiliency against the bottle wall over time thus maintaining the same seal as when bottled. This allows wines to be aged for many years without being exposed to environmental oxygen.

The stopper of the invention can resemble natural wood bark corks although other colors are contemplated. Further, the stopper is printable to allow a company's name or logo to be imprinted on the side of the stopper.

In the preceding detailed description, the invention is described with reference to specific exemplary embodiments thereof. It will, however, be evident that various modifications and changes may be made thereto without departing from the broader spirit and scope of the invention as set forth in the claims. The specification and figures are, accordingly, to be regarded in an illustrative rather than a restrictive sense.

What is claimed is:

1. A stopper for use in a substantially cylindrical bottle opening, the stopper having a substantially cylindrical shape to seal the bottle opening and comprising:
    a first foamed polymer portion of a body extending about a length of the stopper having a first mechanical property; and
    a second polymer portion having a second mechanical property different from said first mechanical property, said second polymer portion coaxially overlying said body of said first polymer portion such that a surface of each end of the stopper comprises said first polymer portion.

2. The stopper of claim 1, wherein said first polymer portion includes a polyolefin.

3. The stopper of claim 1, wherein said first polymer portion includes a mixture of metallocene co-polymers and low density polyethylene.

4. The stopper of claim 3, wherein said weight ratio of said mixture of said metallocene co-polymers and said low density polyethylene is approximately 3:1.

5. The stopper of claim 3, wherein said first polymer portion further includes 0.2 percent to 50 percent of an ethylene/methacrylic acid co-polymer based ionomer resin.

6. The stopper of claim 1, wherein said second polymer portion comprises an ionomer resin.

7. The stopper of claim 6, wherein said second polymer portion is an ethylene/methacrylic acid co-polymer based ionomer resin.

8. The stopper of claim 1, wherein said second polymer portion includes one of a styrene-butadiene elastomer, a styrene-ethylene-butadiene-styrene-elastomer, and a ethylene vinyl acetate elastomer.

9. The stopper of claim 1, wherein said stopper is comprised of approximately 95–99% of said first polymer portion.

10. The stopper of claim 1, further comprising a third polymer portion, wherein said first polymer portion coaxially overlies said third polymer portion.

11. The stopper of claim 10, wherein said third polymer is one of a high density polyethylene polymer and a high density polypropylene polymer.

12. The stopper of claim 11, wherein said third polymer portion has a density of 22–25 lb/cu. ft.

13. The stopper of claim 11, wherein said third polymer portion has an outside diameter of approximately 12 mm.

14. The stopper of claim 11, wherein said third polymer portion has one of a substantially cylindrical shape, a substantially cylindrical shape having an opening extending about its axis, and at least a three-fold radially symmetrical shape extending about its axis.

15. The stopper of claim 11, wherein said first polymer is a mixture of an ethylene/methacrylic acid co-polymer based ionomer resin and a low density polyethylene in a weight ratio of 85:15 and having a density of approximately 15 lb/cu. ft. and a diameter of 9–12 mm,
    wherein said second polymer portion comprises ethylene vinyl acetate having a thickness of 0.2–0.8 mm,
    wherein said third polymer portion is a high density polyethylene polymer having a density of 22–25 lb/cu. ft., and a diameter of approximately 12 mm.

16. A method of protecting liquid in a bottle with a substantially cylindrical bottle opening, comprising:
    providing a stopper having a substantially cylindrical shape to seal the bottle opening and including a first foamed polymer portion and a second polymer portion, said first polymer portion having a first mechanical property and said second polymer portion having a second mechanical property different from said first mechanical property, said second polymer portion configured to coaxially overly a body of said first polymer portion such that a surface of each end of the stopper comprises the first Polymer portion and the second polymer portion; and
    closing off the bottle by insertion of said stopper into said bottle opening.

17. The method of claim 16, wherein said first polymer portion of said stopper includes a mixture of metallocene co-polymers and low density polyethylene.

18. The method of claim 17, wherein said weight ratio of said mixture of said metallocene co-polymers and said low density polyethylene is approximately 3:1.

19. The method of claim 17, wherein said first polymer portion of said stopper further includes 0.2 percent to 50 percent of an ethylene/methacrylic acid co-polymer based ionomer resin.

20. The method of claim 17, wherein said second polymer portion of said stopper is one of an ionomer resin and an elastomer.

21. The stopper of claim 20, wherein said second polymer portion of said stopper includes an ethylene/methacrylic acid co-polymer based ionomer resin.

22. The method of claim 16, wherein said stopper is comprised of approximately 95–99% of said first polymer portion.

23. The method of claim 16, wherein said stopper further comprises a third polymer portion, wherein said first polymer portion of said stopper overlies said third polymer portion.

24. The method of claim 23, wherein said third polymer is one of a high density polyethylene polymer and a high density polypropylene polymer.

25. The method of claim 24, wherein said third polymer portion of said stopper has a density of 22–25 lb/cu. ft.

26. The method of claim 24, wherein said third polymer portion of said stopper has an outside diameter of approximately 12 mm.

27. The method of claim 24, wherein said third polymer portion of said stopper has one of a substantially cylindrical shape, a substantially cylindrical shape having an opening extending about its axis, and at least a three-fold radially symmetrical shape extending about its axis.

28. The method of claim 24, wherein said first polymer of said stopper comprises a mixture of metallocene co-polymers and a low density polyethylene in a weight ratio of 85:15 and having a density of approximately 15 lb/cu. ft. and a diameter of 9–12 mm,
    wherein said second polymer portion of said stopper comprises one of an ionomer resin and an elastomer having a thickness of 0.2–0.8 mm, and
    wherein said third polymer portion of said stopper is a high density polyethylene polymer having a density of 22–25 lb/cu. ft., and a diameter of approximately 12 mm.

* * * * *

UNITED STATES PATENT AND TRADEMARK OFFICE
CERTIFICATE OF CORRECTION

PATENT NO. : 6,153,275  Page 1 of 1
DATED : November 28, 2000
INVENTOR(S) : Yaniger It is certified that error appears in the above-identified patent and that said Letters Patent is hereby corrected as shown below:

<u>Title page,</u>
Item [56], FOREIGN PATENT DOCUMENTS, reference 0 156 957, please delete said reference number and insert -- 0 156 957 B --.
Reference number 0 250 057, please delete said number and insert -- 0 250 057 A --.
Please delete reference number "496 194 A1   10/1992" and insert -- EP 496 194 A1 01/1992 --.
Please delete reference number "2662 142" and insert -- FR 2662 142 A --.
Please delete reference number "60-071643" and insert -- J6 0071 643 A --.
Please delete reference number "60-204316" and insert -- J6 0204 316 A --.
Please delete reference number "63-307060" and insert -- J6 3307 060 A --.
Reference number 2,549,404, please delete date "4/1951" and insert -- 5/1946 --.

Signed and Sealed this

Seventh Day of January, 2003

JAMES E. ROGAN
*Director of the United States Patent and Trademark Office*